J. H. SPANGLER.
RESILIENT WHEEL.
APPLICATION FILED JULY 29, 1914.

1,144,073.

Patented June 22, 1915.

Witnesses
A. H. Opsahl.
E. C. Skinkle

Inventor
John H. Spangler
By his Attorneys
Williamson Merchant

UNITED STATES PATENT OFFICE.

JOHN H. SPANGLER, OF MINNEAPOLIS, MINNESOTA, ASSIGNOR OF ONE-HALF TO JOHN A. NELSON, OF MINNEAPOLIS, MINNESOTA.

RESILIENT WHEEL.

1,144,073.  Specification of Letters Patent.  Patented June 22, 1915.

Application filed July 29, 1914. Serial No. 853,824.

*To all whom it may concern:*

Be it known that I, JOHN H. SPANGLER, a citizen of the United States, residing at Minneapolis, in the county of Hennepin and State of Minnesota, have invented certain new and useful Improvements in Resilient Wheels; and I do hereby declare the following to be a full, clear, and exact description of the invention, such as will enable others skilled in the art to which it appertains to make and use the same.

My invention has for its object to provide a strong, durable and generally efficient resilient wheel, and to such ends, generally stated, the invention consists of the novel construction and arrangement of parts hereinafter described and defined in the claims.

The improved wheel is illustrated in the accompanying drawings wherein like characters indicate like parts throughout the several views.

Figure 1:
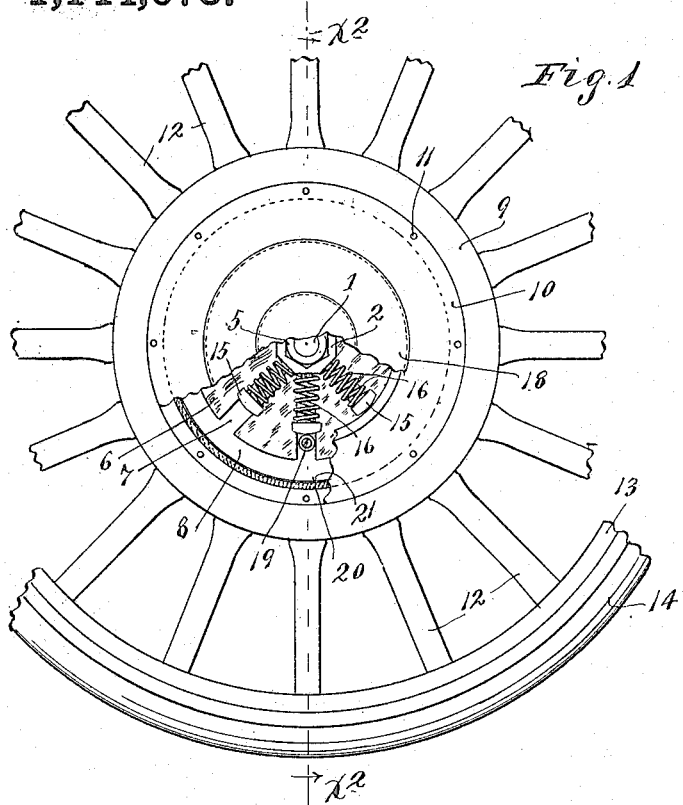
Figure 2:
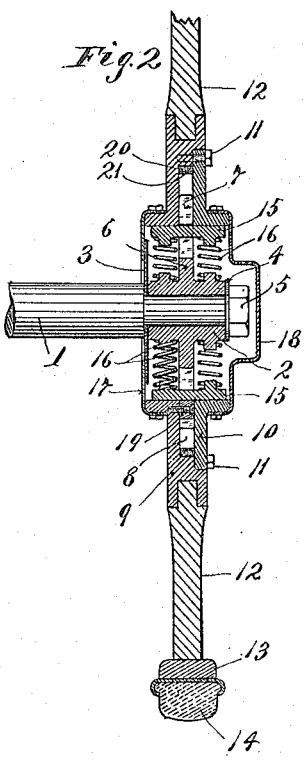
Figure 3:
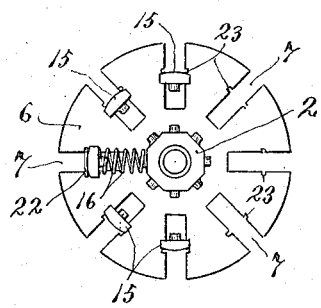
Figure 4:
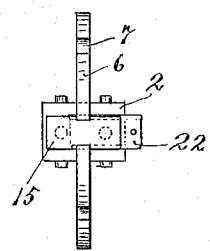

Referring to the drawings: Figure 1 is a fragmentary side elevation with some parts sectioned and some parts broken away, illustrating the preferred form of the improved wheel; Fig. 2 is a vertical section taken on the line $x^2$ $x^2$ of Fig. 1; Fig. 3 is a detail in side elevation showing the hub-engaging disk of the axle; and Fig. 4 is an edge elevation of the parts shown in Fig. 3.

The numeral 1 indicates an axle, only one end of which is shown, but both ends of which would be alike.

The numeral 2 indicates a sleeve which, as shown, is rigidly secured or loose, as may be desired, on the end of the axle, and as shown, is held in place between washers 3 and 4, the former of which is clamped against a shoulder on said axle, and the latter of which is engaged by a nut 5 on the reduced end of the said axle. This sleeve 2, at its intermediate portion, is provided with an outwardly projecting disk-like hub-engaging flange 6 that is formed with a multiplicity of radial slots 7. The outer portion of this disk-like flange 6 is mounted for movements in a seat 8 shown as formed between laterally spaced members 9 and 10 of a two-part wheel hub. Both sections 9 and 10 of the said wheel hub are annular and are rigidly, but detachably connected by screws or bolts 11. Wheel spokes 12 connect the periphery of the hub member 9 to the rim 13 of the wheel. The said wheel rim 13, as shown, is provided with a solid rubber tire 14, but so far as this invention is concerned, the wheel rim and tire can be of any suitable form. The inner surfaces of the hub sections 9 and 10 are cylindrical and of the same diameter, and afford bearing surfaces for a plurality of spring bearings or followers 15. The said followers 15 are in the form of short bars mounted to slide in the respective radial slots 7 of the flange 6, with their ends projecting at both sides thereof. The resilient elements of the wheel are in the form of coiled springs 16 that are radially disposed and are arranged in two series, one series on each side of the flange 6, and compressed between the ends of the followers 15 and the sleeve 2. Preferably the followers 15 and sleeve 2 are provided with bosses that are telescoped into the ends of the springs 16 to hold the same in working position.

Bolted, or otherwise secured to the hub member 9 is an annular flange 17 that overlaps and closely engages the large washer 3 on the axle. A cap 18 is secured to the hub member 10 and incloses the outer side of the hub. The springs 16, flange 6 and nut 5 are therefore inclosed within a dust-tight wheel hub, and the said wheel hub is adapted to contain hard oil or other lubricant.

The engagement of the axle flange 6 with the seat 8 of the wheel hub, permits eccentric movement of the wheel in the plane of the said flange 6, or in other words, in a plane at right angles to the axis of the axle. The radially disposed springs 16 give resilience to the wheel in the plane above noted. In all positions of the wheel, there will be a plurality of the springs turned downward to carry the load and a plurality of springs turned upward to resist reaction of the said springs. Furthermore, the engagement of the axle flange 6 with the wheel hub, as described, gives the wheel great lateral rigidity and strength, while permitting all of the movements required to make the wheel resilient.

In the constructions wherein the wheel should rotate in respect to the axle, the sleeve 2 should rotate on the axle, but in other constructions, the said sleeve may be rigidly secured to the axle and might even be made as an integral part thereof. When the wheel is to be used as a traction wheel, a roller-equipped stud 19 is preferably placed on the main member 9 of the wheel hub and arranged to work in one of the radial slots 7 of the axle flange 6, so as to cause said wheel hub and axle to rotate together.

To afford a resilient stop and a sort of auxiliary cushion which will be brought into action only when the wheel is overloaded, or when the wheel is subject to extreme jars, I place an annular cushion ring 20, preferably of rubber in the outer end of the seat 8 of the wheel hub. Preferably, this cushion 20 is lined with a thin steel ring 21.

To hold the several springs 16 compressed while the hub is being inserted into the seat 8, while the hub sections 9 and 10 are separated, I temporarily employ small lock plates 22 which are slipped into notches 23 formed in the radial seats 7. After the hub flange 6 has been inserted into the seat 8, and after the hub section 10 has been secured to the hub section 9, the lock plates 22 are removed and the springs 16 then throw the followers 15 outward against the cylindrical interiors of the said hub sections 9 and 10.

The wheel described is strong, durable and generally efficient and has such resilience as to make unnecessary the use of a pneumatic tire.

What I claim is:

1. In a resilient wheel, the combination with a continuous disk-like axle flange having radial slots, of a wheel hub having an annular seat receiving said axle flange, followers extending through and removable radially in the radial slots of said axle flange, seated against said wheel hub and spanning said seat, and springs re-acting against said followers and axle flange.

2. In a resilient wheel, the combination with an axle sleeve having a projecting continuous disk-like flange with radial slots, of a wheel hub having an annular seat receiving said disk-like flange, followers projecting through and working in the radial slots of said flange, seated against said wheel hub and spanning said seat, and coiled springs arranged in two radially disposed series, one series on each side of said disk-like flange compressed between said followers and axle sleeve.

3. In a resilient wheel, the combination with an axle sleeve having a projecting continuous disk-like flange with radial slots, of a two-part wheel hub spaced to afford a seat receiving said disk-like flange, followers projecting through and working radially in the slots of said disk-like flange and seated against the interior of said wheel hub, two series of radially disposed springs located, one inside and one outside of said disk-like flange and compressed between said axle sleeve and said followers, and a stud or driving projection on said wheel hub working in one of the radial slots of said disk-like flange.

4. In a resilient wheel, the combination with a disk-like axle flange having radial slots, of a wheel hub having an annular seat receiving said axle flange, followers extending through and movable radially in the radial slots of said axle flange and seated against said wheel hub, springs re-acting against said followers and axle flange, and lock plates detachably engageable with said radial slots, for temporarily holding said followers in inwardly forced positions, and the said springs compressed.

In testimony whereof I affix my signature in presence of two witnesses.

JOHN H. SPANGLER.

Witnesses:
HARRY D. KILGORE,
F. D. MERCHANT.

Copies of this patent may be obtained for five cents each, by addressing the "Commissioner of Patents, Washington, D. C."